(12) United States Patent
Allison et al.

(10) Patent No.: US 6,659,223 B2
(45) Date of Patent: Dec. 9, 2003

(54) SOUND ATTENUATING MATERIAL FOR USE WITHIN VEHICLES AND METHODS OF MAKING SAME

(75) Inventors: Timothy J. Allison, Old Fort, NC (US); Carroll Owenby, Old Fort, NC (US)

(73) Assignee: Collins & Aikman Products Co., Troy, MI (US)

( * ) Notice: Subject to any disclaimer, the term of this patent is extended or adjusted under 35 U.S.C. 154(b) by 78 days.

(21) Appl. No.: 09/972,378

(22) Filed: Oct. 5, 2001

(65) Prior Publication Data

US 2003/0066708 A1 Apr. 10, 2003

(51) Int. Cl.[7] ................................................ E04B 9/00
(52) U.S. Cl. ...................................... 181/290; 181/291
(58) Field of Search ................................ 181/291, 290, 181/293, 294, 284, 296, 286

(56) References Cited

U.S. PATENT DOCUMENTS

| | | | |
|---|---|---|---|
| 3,674,109 A | * 7/1972 | Murase | 181/170 |
| 4,263,356 A | * 4/1981 | Nomura et al. | 428/138 |
| 4,529,639 A | 7/1985 | Peoples, Jr. et al. | 428/95 |
| 4,851,283 A | 7/1989 | Holtrop et al. | 428/284 |
| 4,966,799 A | * 10/1990 | Lucca et al. | 428/95 |
| 5,055,341 A | * 10/1991 | Yamaji et al. | 428/174 |
| 5,298,694 A | 3/1994 | Thompson et al. | 181/286 |
| 5,677,027 A | 10/1997 | Masuda et al. | 428/96 |
| 5,817,408 A | 10/1998 | Orimo et al. | 428/218 |
| 6,145,617 A | * 11/2000 | Alts | 181/290 |

* cited by examiner

Primary Examiner—Kimberly Lockett
(74) Attorney, Agent, or Firm—Myers Bigel Sibley & Sajovec (57) ABSTRACT

Sound attenuating composite articles and methods of making same are provided. Sound attenuating composite article include first, second and/or third and/or fourth layers of material. The first layer of material may be either an acoustic fiber batting and/or an acoustic foam material and may be an elastic or inelastic material. The second layer of material is a thermoplastic material that is fused to a surface of the first layer of material. The third layer of material is a thermoplastic material that is fused to a surface of the second layer of material. The fourth layer of material is a woven or non-woven mixture of fibers, such as scrim material, that is attached to a surface of the third layer of material. Selected portions of the sound attenuating composite article are heated and then compressed (referred to as "tuned") so as to have an acoustic impedance that is greater than an acoustic impedance of adjacent portions.

38 Claims, 8 Drawing Sheets

SOUND ATTENUATING MATERIAL FOR USE WITHIN VEHICLES AND METHODS OF MAKING SAME

FIELD OF THE INVENTION

The present invention relates generally to acoustical insulation materials and, more particularly, to acoustical insulation materials utilized within vehicles.

BACKGROUND OF THE INVENTION

It is generally considered desirable to reduce the level of noise within a vehicle passenger compartment. Noises, such as road noise, engine noise, vibrations, etc., may be attenuated through the use of various acoustically absorptive (or reflective) materials. For example, sound attenuating materials are conventionally provided in conjunction with carpeting for floor panels, upholstery for door panels and headliners, etc.

Various sound attenuating materials have been developed for use in reducing noise levels within passenger compartments of vehicles. For example, U.S. Pat. No. 4,851,283 to Holtrop et al., proposes a thermoformable laminate for use in headliners. The headliner comprises a non-woven fabric bonded to a foamed polymer sheet. The fabric is formed from a blend of low melting staple fibers and high melting staple fibers.

U.S. Pat. No. 5,298,694 to Thompson proposes a non-woven acoustical insulation web. The web comprises thermoplastic fibers, and particularly a blend of melt-blown microfibers and crimped bulking fibers.

U.S. Pat. No. 5,677,027 to Masuda et al., proposes a sound insulating structure comprising a covering layer, a panel, and a cushioning layer. The cushioning layer comprises a first fiber such as polyethylene terephthalate (PET) and a second fiber that is of a shell-core construction wherein the majority of the core is PET.

U.S. Pat. No. 5,817,408 to Orimo et al., proposes a sound insulating structure which includes low and high density thermoplastic fibers. PET is preferred as a thermoplastic synthetic fiber.

U.S. Pat. No. 4,529,639 to Peoples, Jr. et al. proposes a molded foam-backed carpet assembly which includes a carpet layer, a moldable thermoplastic polymer layer and one or more foam pads fusibly bonded to the thermoplastic layer and extending over less than the entire surface of the thermoplastic polymer layer to provide desired cushioning and sound and thermal insulation only in preselected areas of the carpet.

In general, the ability of conventional materials to attenuate sound increases as the amount of material increases. Unfortunately, increased materials often increases the weight of sound attenuating material, which may be undesirable. Accordingly, there is a continuing need for acoustical insulation materials that exhibit superior sound attenuating properties, while also being lightweight and low in cost.

SUMMARY OF THE INVENTION

In view of the above discussion, sound attenuating composite articles, and methods of making the same, are provided that can utilize a wide variety of fiber and/or foam acoustic layers to achieve various acoustic and functional goals. According to embodiments of the present invention sound attenuating composite articles include first, second, third, and fourth layers of material which are joined together. The first layer of material may be either an acoustic fiber batting and/or an acoustic foam material and may be an elastic or inelastic material. The second layer of material is a thermoplastic material that is fused to a surface of the first layer of material. The third layer of material is a thermoplastic material that is fused to a surface of the second layer of material. The fourth layer of material is a blend of fibers (woven or non-woven), such as scrim material, that is attached to a surface of the third layer of material. Selected portions of the sound attenuating composite article are heated and then compressed so as to have an acoustic impedance that is greater than an acoustic impedance of adjacent portions.

According to embodiments of the present invention, sound attenuating composite articles include first, second, and third layers of material which are joined together. The first layer of material may be either an acoustic fiber batting and/or an acoustic foam material and may be an elastic or inelastic material. The second layer of material is a thermoplastic material that is fused to a surface of the first layer of material. The third layer of material is a thermoplastic material that is fused to a surface of the second layer of material. Selected portions of the sound attenuating composite article are heated and then compressed so as to have an acoustic impedance that is greater than an acoustic impedance of adjacent portions.

Sound attenuating composite articles according to other embodiments of the present invention include first and second layers of material which are joined together. The first layer of material may be either an acoustic fiber batting and/or an acoustic foam material and may be an elastic or inelastic material. The second layer of material is a thermoplastic material that is fused to a surface of the first layer of material. Selected portions of the sound attenuating composite article are heated and then compressed so as to have an acoustic impedance that is greater than an acoustic impedance of adjacent portions.

Sound attenuating composite articles according to other embodiments of the present invention include first, second, and third layers of material which are joined together. The first layer of material may be either an acoustic fiber batting and/or an acoustic foam material and may be an elastic or inelastic material. The second layer of material is a thermoplastic material that is fused to a surface of the first layer of material. The third layer of material is a blend of fibers (woven or non-woven), such as a scrim material, that is attached to a surface of the first layer of material. Selected portions of the sound attenuating composite article are heated and then compressed so as to have an acoustic impedance that is greater than an acoustic impedance of adjacent portions.

Methods of producing sound attenuating composite articles according to embodiments of the present invention include providing an acoustic fiber batting and/or acoustic foam material; extruding a thermoplastic material onto the first layer of material as a second layer of material; compressing the first and second layers of material, such as via nip rolls; extruding a thermoplastic material onto the second layer of material as a third layer of material; attaching a material, such as scrim material, to a surface of the third layer of material as a fourth layer of material; compressing the first, second, third, and fourth layers of material, such as via nip rolls, to a combined, predetermined thickness; heating selected portions of the composite article, and compressing the selected portions so as to have an acoustic impedance that is greater than an acoustic impedance of adjacent portions. Various combinations and numbers of layers may be utilized according to embodiments of the present invention.

Sound attenuating composite articles according to embodiments of the present invention can be "tuned" to provide desired sound deadening and absorption properties in selected vehicle locations, such as floor pans, door panels, etc. The term "tuned" means that portions of a composite article can be formed to have a specific acoustic impedance designed to attenuate sound in one or more frequencies or frequency bands. Moreover, sound attenuating composite articles according to embodiments of the present invention may have reduced overall weight compared with conventional sound proofing materials, and without sacrificing sound attenuation properties.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present.

Embodiments of the present invention provide sound attenuating composite articles for use in various applications, particularly automotive applications. Exemplary automotive applications within which sound attenuating composite articles according to embodiments of the present invention may be utilized include, but are not limited to, carpeting for floors, door panels, and other interior portions, and upholstery for various interior portions, such as headliners, dashboards, etc.

Figure 1A:
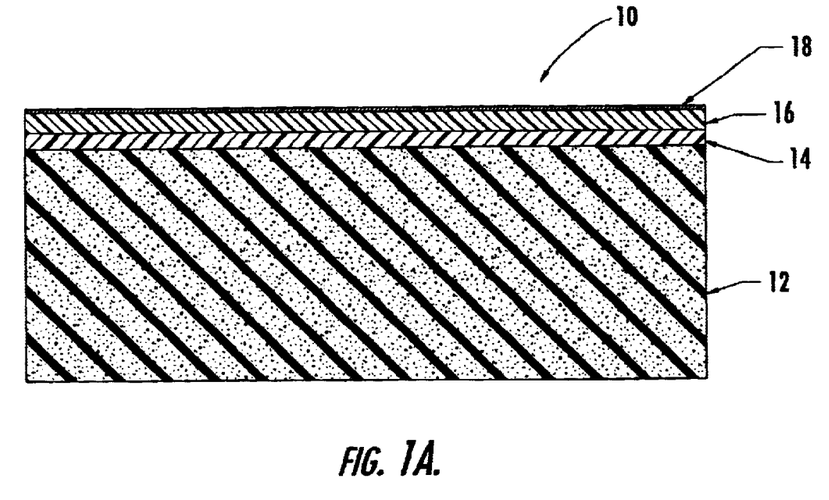
FIG. 1A is a cross-sectional view of a four layer sound attenuating composite article, according to embodiments of the present invention.
Figure 1B:
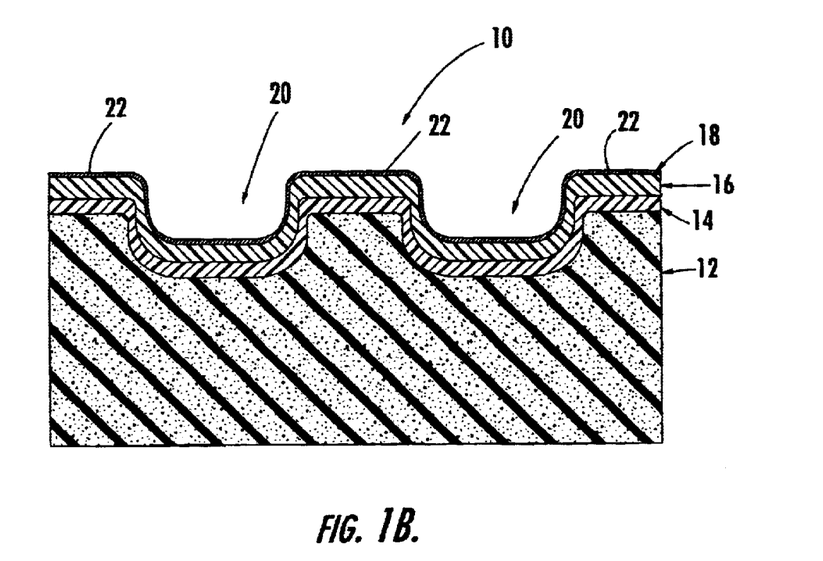
FIG. 1B illustrates selected portions of the sound attenuating composite article of FIG. 1A compressed relative to adjacent portions so as to have an acoustic impedance that is greater than an acoustic impedance of adjacent portions.

Referring to FIGS. 1A–1B, a cross section of a sound attenuating composite article 10 according to embodiments of the present invention is illustrated. The illustrated sound attenuating composite article 10 includes first, second, third, and fourth layers of material 12, 14, 16, 18 which are joined together as described below. The first layer of material 12 may be either an acoustic fiber batting and/or an acoustic foam material. Various types of synthetic fibers, natural fibers, and/or blends thereof may be utilized. In addition, various types of foams may be utilized. Exemplary batting materials may include, but are not limited to, densified polyester batting and needled polyester batting. Exemplary foams may include, but are not limited to, gel coat latex, sheet urethane foam, polyethylene or EVA (ethylene vinyl acetate) foam. The first layer of material 12 may be an elastic or inelastic material and serves the function of an acoustic absorber and/or decoupler.

The second layer of material 14 is a thermoplastic material that is fused to a surface of the first layer of material 12. The second layer of material 14 acts as an adhesive to join or tie the first and third layers of material 12, 16 together. Exemplary materials for use as the second layer of material 14 may include, but are not limited to, polyethylene, EVA, and polypropylene. According to embodiments of the present invention, the first and second layers of material 12, 14 have a combined thickness of between about fifteen and thirty millimeters (15–30 mm).

The third layer of material 16 is a thermoplastic material that is fused to a surface of the second layer of material 14. Exemplary materials for use as the third layer of material 16 may include, but are not limited to, mineral filled EVA, PVC (polyvinyl chloride), and TPO (thermoplastic elastomer—olefinic). Filler level may be between about zero percent and about eighty percent (0–80%), depending on the application. According to embodiments of the present invention, the first, second and third layers of material 12, 14, 16 have a combined thickness of between about 4 and 25 mm.

The fourth layer of material 18 may be a blend (woven or non-woven) of one or more types of fibers that is attached to a surface of the third layer of material in face-to-face relationship, as illustrated. The fourth layer of material 18 may be attached to the third layer of material 16 in various ways without limitation. For example, the fourth and third layers of material 18, 16 may be attached together via adhesive(s) and/or via other known techniques know to those skilled in this art.

According to an embodiment of the present invention, the fourth layer of material 18 may be a scrim material having a woven mixture of at least about 70% polyester fibers and at least about 13% polyolefin fibers. A suitable scrim material is THINSULATE® brand insulation, available from Minnesota Mining & Manufacturing Co., St. Paul, Minn. According to embodiments of the present invention, the fourth layer of material 18 has a thickness of less than or equal to about two millimeters (2 mm). The fourth layer of material 18 preferably has a mass of between about 1 and 1.5 $Kg/m^2$.

According to embodiments of the present invention, the fourth layer of material 18 may be a spun bonded polyester fiber product (polyester matrix fiber) ranging from about seventeen grams per square meter to about ninety grams per square meter (17–90 $g/m^2$) and having a low melt polyester binder of between about seven percent and about seventeen percent (7–17%). Such a material is available from the Frudenberg Nonwovens Group.

According to embodiments of the present invention, the fourth layer of material 18 may be a spun laced product ranging in weight from about twenty grams per square meter to about ninety grams per square meter (20–90 $g/m^2$). Such a material has a low melt nylon binder and a high melt polyester matrix fiber (polyester fiber with low melt nylon sheath; nylon content between about eighteen percent and about twenty two percent (18–22%) of total material weight). Such a material is available from Colbond, Inc.

According to embodiments of the present invention, the fourth layer of material 18 may be a waste type product referred to as "shoddy" and may contain a wide variety of fibers, both natural and synthetic. Such a material can be needled or densified using a low melt binder fiber and heat.

According to embodiments of the present invention, the fourth layer of material 18 may contain a variety of materials other than fiber such as foam, fabric, etc. Typical weight ranges for such a material may be from about six ounces per square yard to about thirty ounces per square yard (6–30 $oz/yd^2$). Materials of this type are available from Jamesville Products.

As is understood by those skilled in this art, the acoustic impedance of a material is defined as material density times acoustic velocity, and is expressed in units of Rayls (kg/s $m^2$). Acoustic impedance defines how easy it is for air to move through a material. Thus, for fibrous materials, acoustic impedance depends upon the density of the fibrous material (lb/sq ft) and fiber diameter. Generally, the heavier the blanket and the finer the fibers, the higher the acoustic impedance. Moreover, thicker layers typically have more acoustic impedance than thin layers.

According to embodiments of the present invention the first layer of material 12 has an acoustic impedance of at least about 25 Rayls, and may have an acoustic impedance in the range of between about 25 Rayls and about 500 Rayls. The second layer of material 14 has an acoustic impedance of at least about 200 Rayls, and may have an acoustic impedance in the range of between about 200 Rayls and about 10,000 Rayls (or may be non-porous). The third layer of material 16 has an acoustic impedance of at least about 300 Rayls, and may have an acoustic impedance in the range of between about 300 Rayls and about 10,000 Rayls (or may be non-porous). The fourth layer of material 18 has an acoustic impedance of at least about 500 Rayls. The sound attenuating composite article 10, collectively will typically have an acoustic impedance of between about 25 Rayls and about 2,000 Rayls (but may be higher) prior to having portions thereof compressed.

As illustrated in FIG. 1B, selected portions 20 of the sound attenuating composite article 10 of FIG. 1A are compressed (e.g., via a mold) relative to adjacent portions 22 so as to have an acoustic impedance that is greater than an acoustic impedance of adjacent portions. Acoustic impedance values of between about 400 Rayls and about 15,000 Rayls may be achieved at the selected portions 20 of the sound attenuating composite article 10. Operations for compressing selective portions of the composite article 10 will be described below with respect to FIG. 5A.

Figure 2A:
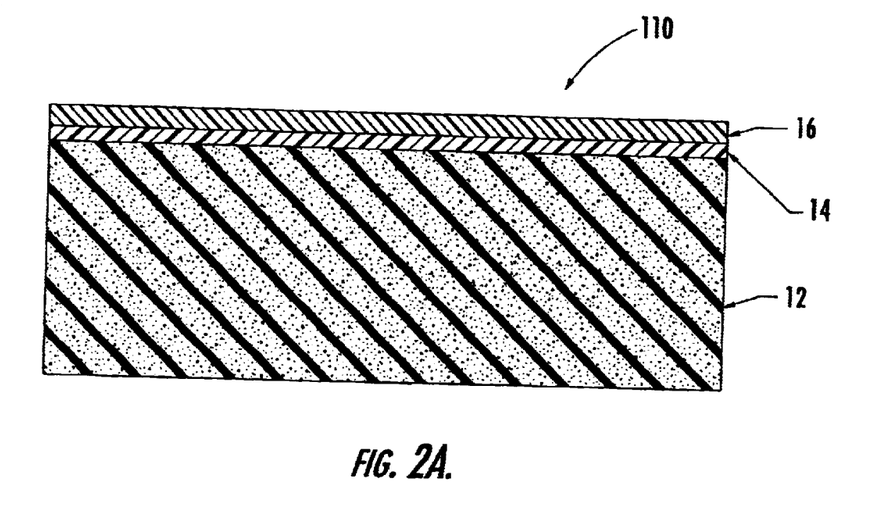
FIG. 2A is a cross-sectional view of a three layer sound attenuating composite article, according to embodiments of the present invention.
Figure 2B:
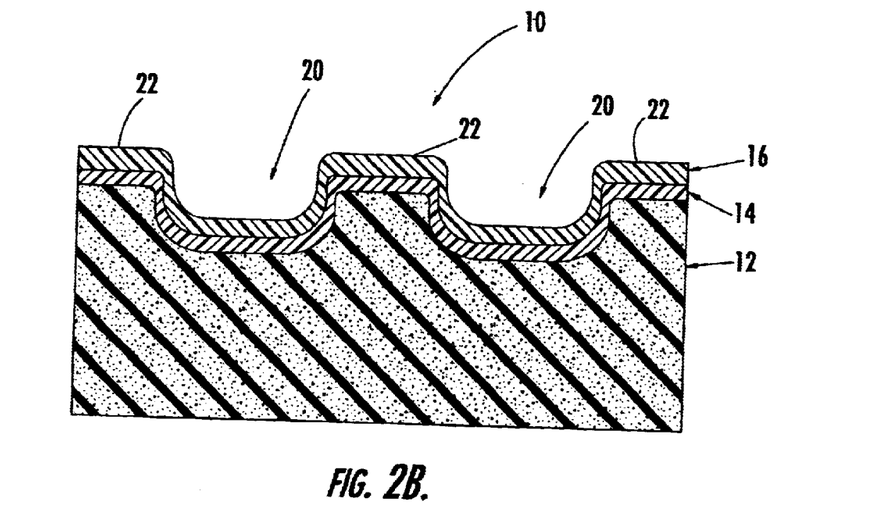
FIG. 2B illustrates selected portions of the sound attenuating composite article of FIG. 2A compressed relative to adjacent portions so as to have an acoustic impedance that is greater than an acoustic impedance of adjacent portions.

Referring now to FIGS. 2A–2B, a cross section of a sound attenuating composite article 110 according to embodiments of the present invention is illustrated. The illustrated sound attenuating composite article 110 includes first, second, and third layers of material 12, 14, 16, as described above with respect to FIGS. 1A–1B, and which are joined together as described below. As described above, the first layer of material 12 may be either an acoustic fiber batting and/or an acoustic foam material and may be an elastic or inelastic material.

The second layer of material 14 is a thermoplastic material that is fused to a surface of the first layer of material 12. According to embodiments of the present invention, the first and second layers of material 12, 14 have a combined thickness of between about four millimeters and thirty millimeters (4–30 mm). The third layer of material 16 is a thermoplastic material that is fused to a surface of the second layer of material 14. According to embodiments of the present invention, the first, second and third layers of material 12, 14, 16 have a combined thickness of between about 4 and 25 mm.

According to embodiments of the present invention the first layer of material 12 has an acoustic impedance of at least about 25 Rayls, and may have an acoustic impedance in the range of between about 25 Rayls and about 500 Rayls. The second layer of material 14 has an acoustic impedance of at least about 200 Rayls, and may have an acoustic impedance in the range of between about 200 Rayls and about 10,000 Rayls (or may be non-porous). The third layer of material 16 has an acoustic impedance of at least about 300 Rayls, and may have an acoustic impedance in the range of between about 300 Rayls and about 10,000 Rayls (or may be non-porous). The sound attenuating composite article 110, collectively will typically have an acoustic impedance of between about 25 Rayls and about 2,000 Rayls (but may be higher) prior to having portions thereof compressed.

As illustrated in FIG. 2B, selected portions 20 of the sound attenuating composite article 110 of FIG. 2A are compressed (e.g., via a mold) relative to adjacent portions 22 so as to have an acoustic impedance that is greater than an acoustic impedance of adjacent portions. Acoustic impedance values of between about 400 Rayls and about 15,000 Rayls may be achieved at the selected portions 20 of the sound attenuating composite article 110. Operations for compressing selective portions of the composite article 110 will be described below with respect to FIG. 5B.

Figure 3A:
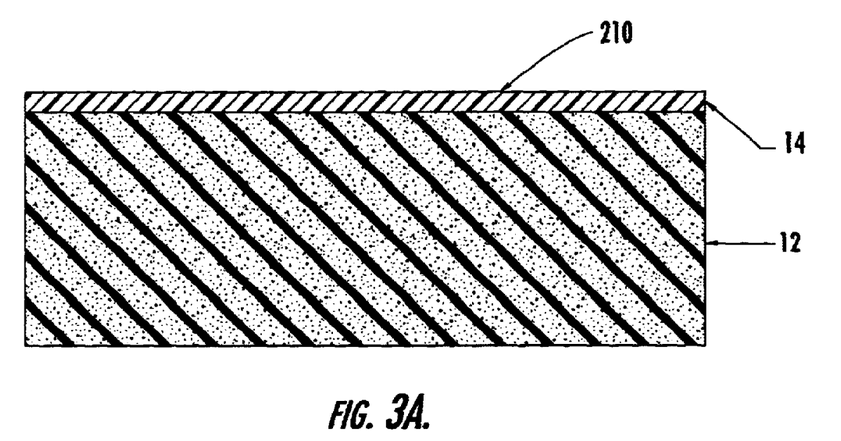
FIG. 3A is a cross-sectional view of a two layer sound attenuating composite article, according to embodiments of the present invention.
Figure 3B:
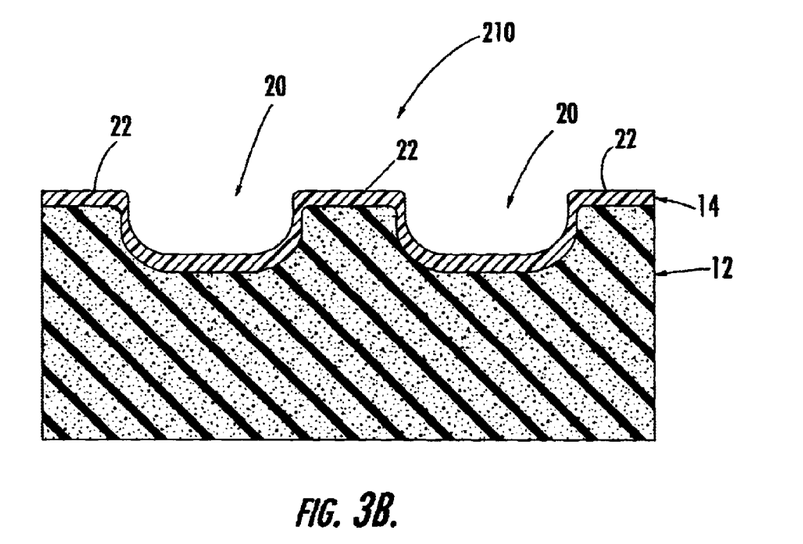
FIG. 3B illustrates selected portions of the sound attenuating composite article of FIG. 3A compressed relative to adjacent portions so as to have an acoustic impedance that is greater than an acoustic impedance of adjacent portions.

Referring now to FIGS. 3A–3B, a cross section of a sound attenuating composite article 210 according to embodiments of the present invention is illustrated. The illustrated sound attenuating composite article 210 includes first and second layers of material 12, 14 as described above with respect to FIGS. 1A–1B, and which are joined together as described below. As described above, the first layer of material 12 may be either an acoustic fiber batting and/or an acoustic foam material and may be an elastic or inelastic material.

The second layer of material 14 is a thermoplastic material that is fused to a surface of the first layer of material 12. According to embodiments of the present invention, the first and second layers of material 12, 14 have a combined thickness of between about four millimeters and thirty millimeters (4–30 mm).

According to embodiments of the present invention the first layer of material 12 has an acoustic impedance of at least about 25 Rayls, and may have an acoustic impedance in the range of between about 25 Rayls and about 500 Rayls. The second layer of material 14 has an acoustic impedance of at least about 200 Rayls, and may have an acoustic impedance in the range of between about 200 Rayls and about 10,000 Rayls (or may be non-porous). The sound attenuating composite article 210, collectively will typically have an acoustic impedance of between about 25 Rayls and about 2,000 Rayls (but may be higher) prior to having portions thereof compressed.

As illustrated in FIG. 3B, selected portions 20 of the sound attenuating composite article 210 of FIG. 3A are compressed relative to adjacent portions 22 so as to have an acoustic impedance that is greater than an acoustic impedance of adjacent portions. Acoustic impedance values of between about 400 Rayls and about 15,000 Rayls may be achieved at the selected portions 20 of the sound attenuating composite article 210. Operations for compressing selective portions of the composite article 210 will be described below with respect to FIG. 5C.

Figure 4A:
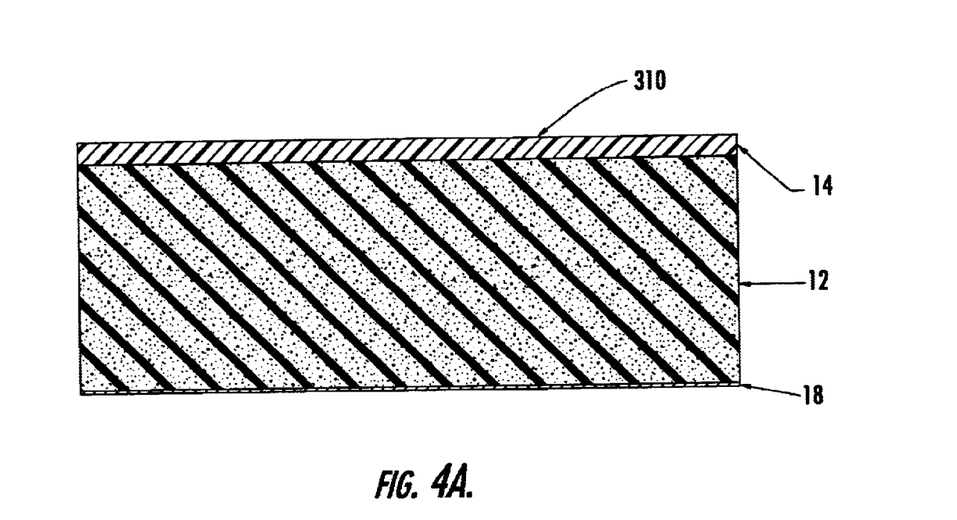
FIG. 4A is a cross-sectional view of a three layer sound attenuating composite article, according to embodiments of the present invention.
Figure 4B:
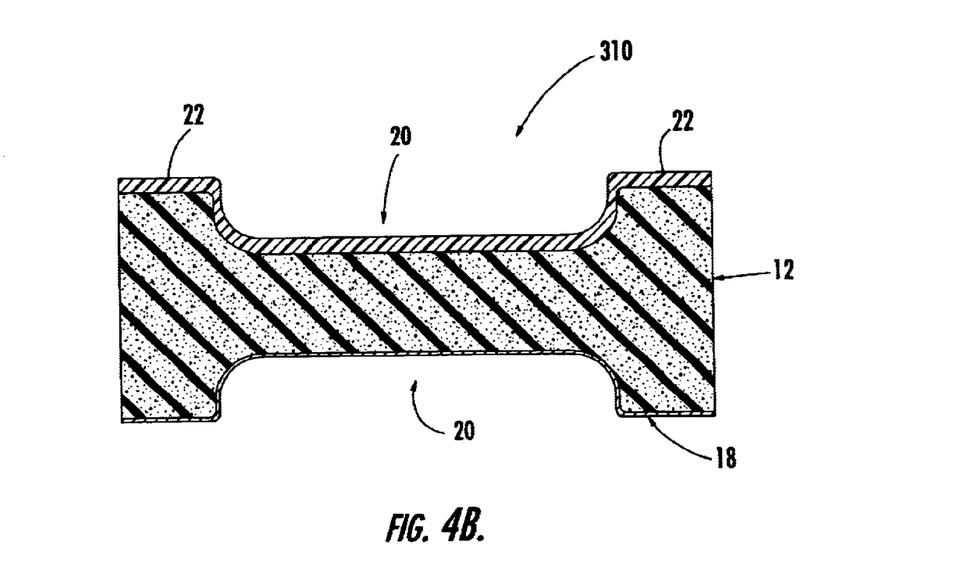
FIG. 4B illustrates selected portions of the sound attenuating composite article of FIG. 4A compressed relative to adjacent portions so as to have an acoustic impedance that is greater than an acoustic impedance of adjacent portions.

Referring now to FIGS. 4A–4B, a cross section of a sound attenuating composite article 310 according to embodiments of the present invention is illustrated. The illustrated sound attenuating composite article 310 includes first, second, and third layers of material 12, 14, 18, as described above with respect to FIGS. 1A–1B, and which are joined together as described below. As described above, the first layer of material 12 may be either an acoustic fiber batting and/or an acoustic foam material and may be an elastic or inelastic material.

The second layer of material 14 is a thermoplastic material that is fused to a surface of the first layer of material 12. According to embodiments of the present invention, the first and second layers of material 12, 14 have a combined thickness of between about four millimeters and thirty millimeters (4–30 mm). The third layer of material 18 may be a blend (woven or non-woven) of one or more types of fibers that is attached to a surface of the first layer of material 12 in face-to-face relationship, as illustrated. The third layer of material 18 may be attached to the first layer of material 12 in various ways without limitation. For example, the first and third layers of material 12, 18 may be attached together via adhesive(s) and/or via other known techniques know to those skilled in this art.

According to embodiments of the present invention, the third layer of material 18 is a scrim material having a woven mixture of at least about 70% polyester fibers and at least about 13% polyolefin fibers. Other materials may be utilized for the third layer of material 18 as described above with respect to the fourth layer 18 of FIG. 1A. According to embodiments of the present invention, the third layer of material 18 has a thickness of less than or equal to about two millimeters (2 mm). The third layer of material 18 preferably has a mass of between about 1 and 1.5 Kg/m$^2$.

According to embodiments of the present invention the first layer of material 12 has an acoustic impedance of at least about 25 Rayls, and may have an acoustic impedance in the range of between about 25 Rayls and about 500 Rayls. The second layer of material 14 has an acoustic impedance of at least about 200 Rayls, and may have an acoustic impedance in-the range of between about 200 Rayls and about 10,000 Rayls (or may be non-porous). The third layer of material 18 has an acoustic impedance of between about 25 Rayls and about 2,000 Rayls. The sound attenuating composite article 310, collectively will typically have an acoustic impedance of at between about 25 Rayls and about 2,000 Rayls (but may be higher) prior to having portions thereof compressed.

As illustrated in FIG. 4B, selected portions 20 of the sound attenuating composite article 310 of FIG. 4A are compressed relative to adjacent portions 22 so as to have an acoustic impedance that is greater than an acoustic impedance of adjacent portions. Acoustic impedance values of between about 400 Rayls and about 15,000 Rayls may be achieved at the selected portions 20 of the sound attenuating composite article 310. Operations for compressing selective portions of the composite article 310 will be described below with respect to FIG. 5D.

Figure 5A:
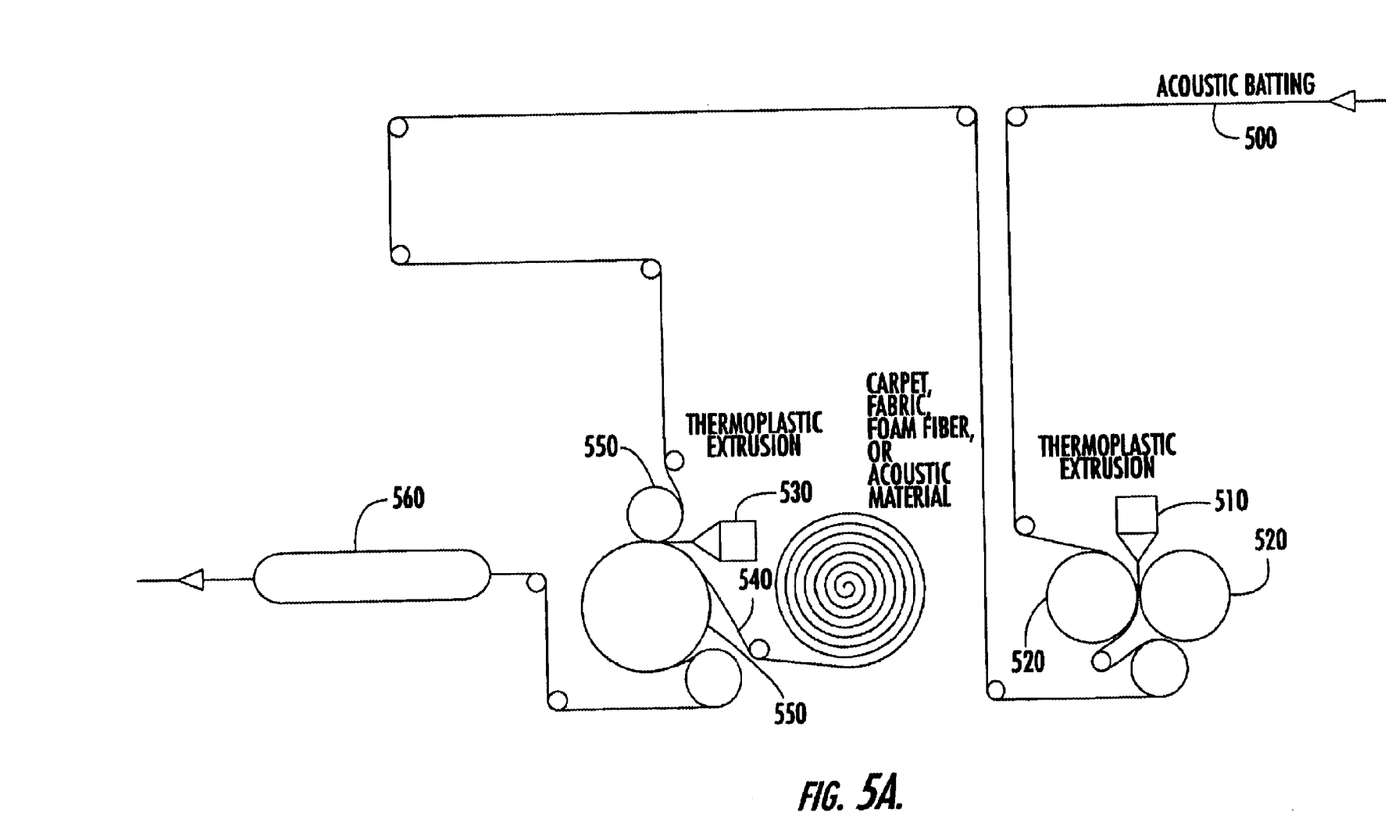
FIGS. 5A–5D are schematic diagrams that illustrate methods of producing sound attenuating composite articles according to embodiments of the present invention.

Referring now to FIG. 5A, a schematic diagram is provided that illustrates methods of producing sound attenuating composite articles 10 (FIG. 1A) according to embodiments of the present invention. An acoustic fiber batting and/or acoustic foam material is provided (indicated by 500) which serves as a first layer of material 12 for the sound attenuating composite article 10. Thermoplastic material is extruded onto the first layer of material 12 as a second layer of material 14, as indicated by 510. The thermoplastic material is extruded onto a surface of the first layer of material 12 at a temperature of between about 350° F. and about 450° F. such that the thermoplastic material fuses to the first layer of material 12. The first and second layers of material 12, 14 are then compressed via nip rolls 520 to a combined thickness of between about four millimeters and thirty millimeters (4–30 mm).

Thermoplastic material is extruded onto the second layer of material 14 as a third layer of material 16, as indicated by 530. The thermoplastic material is extruded onto a surface of the second layer of material 14 at a temperature of between about 300° F. and about 450° F. such that the third layer of material fuses to the second layer of material.

Material (indicated by 540), such as scrim material, is attached to a surface of the third layer of material 16 in face-to-face relationship, and serves as a fourth layer of material 18 for the sound attenuating composite article 10. The first, second, third, and fourth layers of material 12, 14, 16, 18 are then compressed via nip rolls 550 to a combined thickness of between about 4 mm and about 25 mm.

The composite article 10 is then placed within a heated mold 560 and heated via infrared radiation (or via other energy sources such as conventional ovens, hot air, microwave ovens, etc.) to a temperature of between about 200° F. and about 420° F. Combinations of two or more heating techniques may also be utilized. Selective portions 20 of the heated composite article 10 are then compressed within the mold 560 so as to have an acoustic impedance that is greater than an acoustic impedance of adjacent portions 22, as described above with respect to FIG. 1B.

Figure 5B:
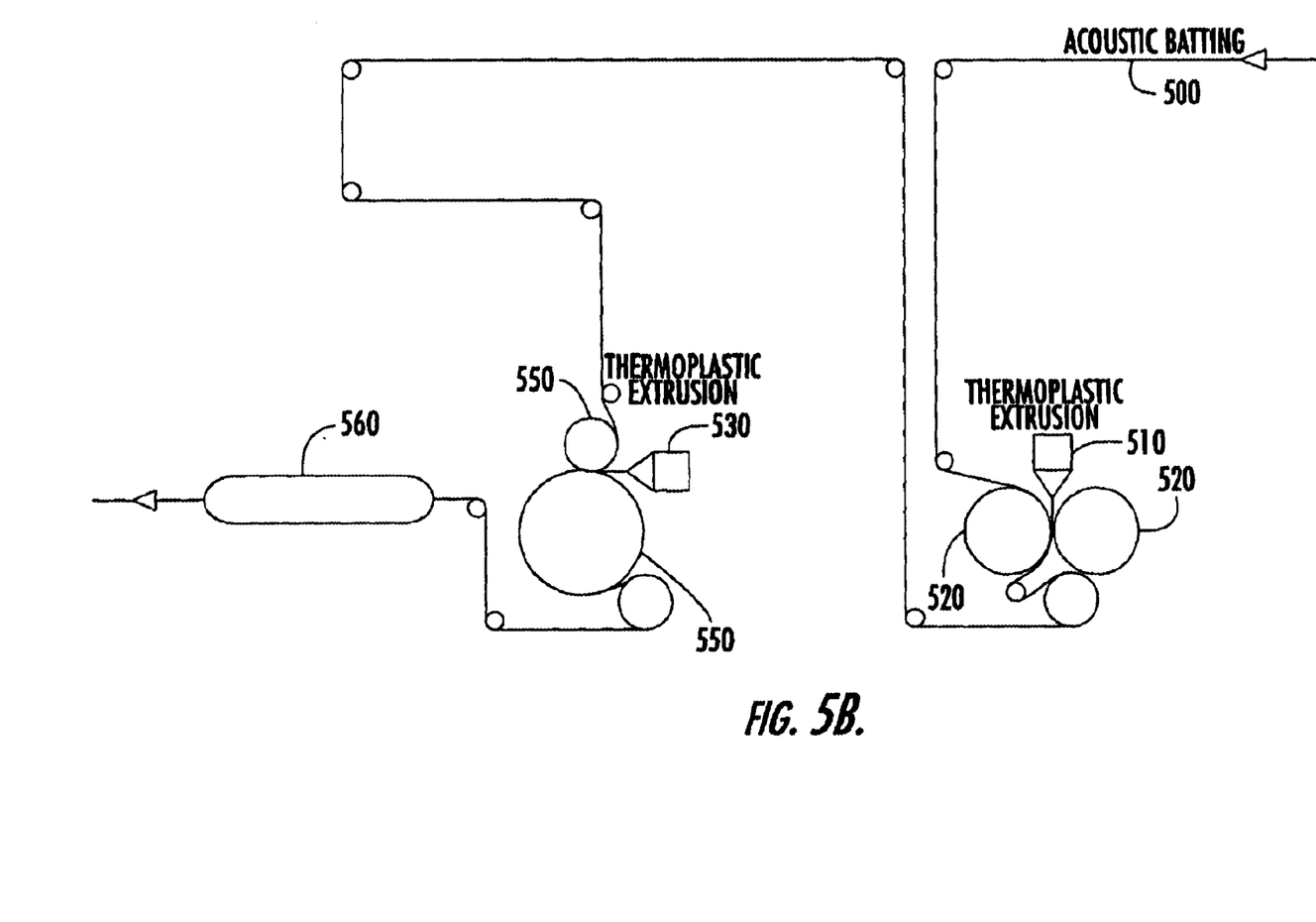

Referring now to FIG. 5B, a schematic diagram is provided that illustrates methods of producing sound attenuating composite articles 110 (FIG. 2A) according to embodiments of the present invention. An acoustic fiber batting and/or acoustic foam material is provided (indicated by 500)

which serves as a first layer of material 12 for the sound attenuating composite article 110. Thermoplastic material is extruded onto the first layer of material 12 as a second layer of material 14, as indicated by 510. The thermoplastic material is extruded onto a surface of the first layer of material 12 at a temperature of between about 350° F. and about 450° F. such that the thermoplastic material fuses to the first layer of material 12. The first and second layers of material 12, 14 are then compressed via nip rolls 520 to a combined thickness of between about four millimeters and thirty millimeters (4–30 mm).

Thermoplastic material is extruded onto the second layer of material 14 as a third layer of material 16, as indicated by 530. The thermoplastic material is extruded onto a surface of the second layer of material 14 at a temperature of between about 300° F. and about 450° F. such that the third layer of material 16 fuses to the second layer of material 14. The first, second, and third layers of material 12, 14, 16 are then compressed via nip rolls 550 to a combined thickness of between about 4 mm and about 25 mm.

The composite article 110 is then placed within a heated mold 560 and heated via infrared radiation (or via other energy sources such as conventional ovens, hot air, microwave ovens, etc.) to a temperature of between about 200° F. and about 420° F. Combinations of two or more heating techniques may also be utilized. Selective portions 20 of the heated composite article 110 are then compressed within the heated mold 560 so as to have an acoustic impedance that is greater than an acoustic impedance of adjacent portions 22, as described above with respect to FIG. 2B.

Figure 5C:
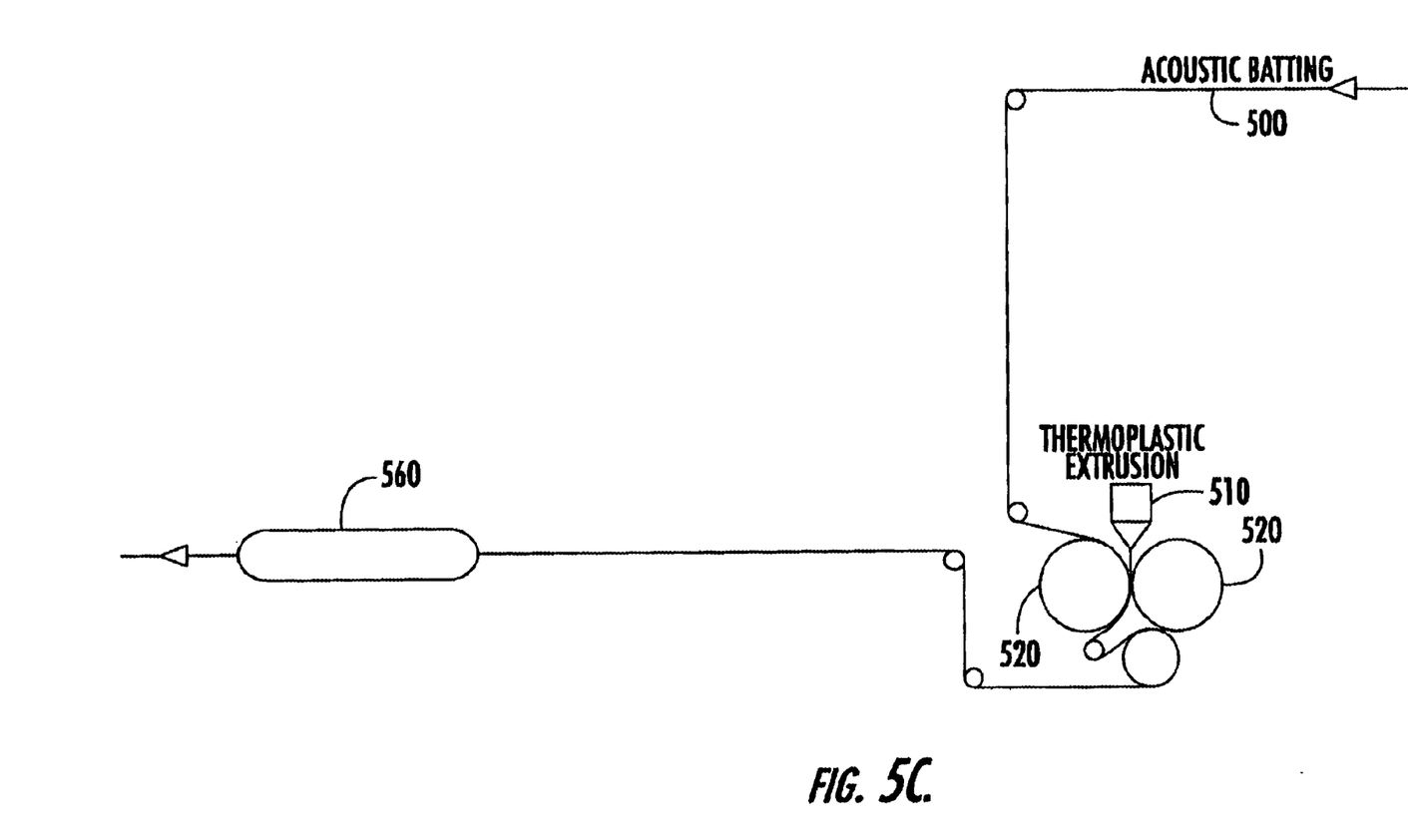

Referring now to FIG. 5C, a schematic diagram is provided that illustrates methods of producing sound attenuating composite articles 210 (FIG. 2C) according to embodiments of the present invention. An acoustic fiber batting and/or acoustic foam material is provided (indicated by 500) which serves as a first layer of material 12 for the sound attenuating composite article 210. Thermoplastic material is extruded onto the first layer of material 12 as a second layer of material 14, as indicated by 510. The thermoplastic material is extruded onto a surface of the first layer of material 12 at a temperature of between about 300° F. and about 450° F. such that the thermoplastic material fuses to the first layer of material 12. The first and second layers of material 12, 14 are then compressed via nip rolls 520 to a combined thickness of between about four millimeters and thirty millimeters (4–30 mm).

The composite article 210 is then placed within a heated mold 560 and heated via infrared radiation (or via other energy sources such as conventional ovens, hot air, microwave ovens, etc.) to a temperature of between about 200° F. and about 420° F. Combinations of two or more heating techniques may also be utilized. Selective portions 20 of the heated composite article 210 are then compressed within the mold 560 so as to have an acoustic impedance that is greater than an acoustic impedance of adjacent portions 22, as described above with respect to FIG. 2C.

Figure 5D:
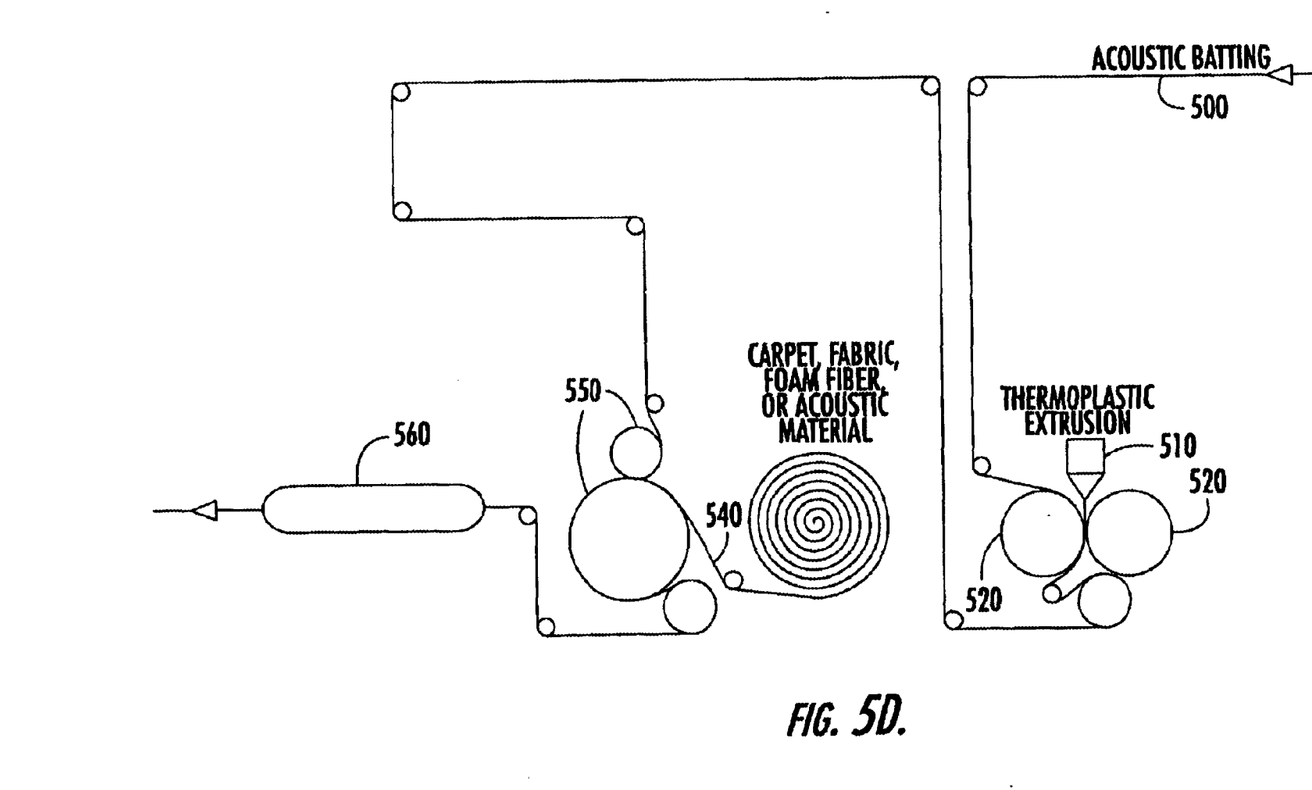

Referring now to FIG. 5D, a schematic diagram is provided that illustrates methods of producing sound attenuating composite articles 310 (FIG. 4A) according to embodiments of the present invention. An acoustic fiber batting and/or acoustic foam material is provided (indicated by 500) which serves as a first layer of material 12 for the sound attenuating composite article 310. Thermoplastic material is extruded onto the first layer of material 12 as a second layer of material 14, as indicated by 510. The thermoplastic material is extruded onto a surface of the first layer of material 12 at a temperature of between about 300° F. and about 450° F. such that the thermoplastic material fuses to the first layer of material 12.

Material (indicated by 540), such as scrim material, is attached to a surface of the first layer of material 12 in face-to-face relationship, and serves as a third layer of material 18 for the sound attenuating composite article 310. The first, second, and third layers of material 12, 14, 18 are then compressed via nip rolls 550 to a combined thickness of between about 4 mm and about 25 mm.

The composite article 310 is then placed within a mold 560 and heated via infrared radiation (or via other energy sources such as conventional ovens, hot air, microwave ovens, etc.) to a temperature of between about 200° F. and about 420° F. Combinations of two or more heating techniques may also be utilized. Selective portions 20 of the heated composite article 310 are then compressed within the mold 560 so as to have an acoustic impedance that is greater than an acoustic impedance of adjacent portions 22, as described above.

Selection of portions of a composite article to compress, and the amount of compression, allow the composite article to be "tuned" to provide desired sound deadening and absorption properties in selected vehicle locations, such as floor pans, door panels, etc. Various types of infrared ovens and compression molds may be utilized in producing sound attenuating composite articles according to embodiments of the present invention. Embodiments of the present invention are not limited to particular ovens or molds.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A sound attenuating composite article, comprising:
    a first layer of material, wherein the first layer of material is selected from the group consisting of acoustic fiber batting and acoustic foam;
    a second layer of thermoplastic material fused to a surface of the first layer of material;
    a third layer of thermoplastic material fused to a surface of the second layer of thermoplastic material; and
    a fourth layer of material attached to a surface of the third layer of material in face-to-face relationship therewith, wherein the fourth layer of material comprises a blend of at least about 70% polyester fibers and at least about 13% polyolefin fibers;
    wherein one or more selected portions of the composite article are compressed relative to adjacent portions so as to have an acoustic impedance that is greater than an acoustic impedance of portions adjacent the one or more selected portions.

2. The sound attenuating composite article of claim 1, wherein the second layer of thermoplastic material comprises material selected from the group consisting of polyethylene, ethylene vinyl acetate, and polypropylene, and wherein the third layer of thermoplastic material comprises material selected from the group consisting of ethylene vinyl acetate, polyvinyl chloride, and thermoplastic elastomer-olefinic.

3. The sound attenuating composite article of claim 1, wherein the fourth layer of material has a thickness of less than or equal to about 2 mm.

4. The sound attenuating composite article of claim 1, wherein the first and second layers of material have a combined thickness of between about four millimeters and thirty millimeters (4–30 mm).

5. The sound attenuating composite article of claim 1, wherein the first, second and third layers of material have a combined thickness of between about 4 and 25 mm.

6. A sound attenuating composite article, comprising:
  a first layer of material, wherein the first layer of material is selected from the group consisting of acoustic fiber batting and acoustic foam;
  a second layer of thermoplastic material fused to a surface of the first layer of material, wherein the second layer of material comprises a thermoplastic material; and
  a third layer of material attached to a surface of the first layer of material in face-to-face relationship therewith, wherein the third layer of material comprises a blend of at least about 70% polyester fibers and at least about 13% polyolefin fibers;
  wherein one or more selected portions of the composite article are compressed relative to adjacent portions so as to have an acoustic impedance that is greater than an acoustic impedance of portions adjacent the one or more selected portions.

7. The sound attenuating composite article of claim 6, wherein the second layer of thermoplastic material comprises material selected from the group consisting of polyethylene, ethylene vinyl acetate, and polypropylene.

8. The sound attenuating composite article of claim 6, wherein the third layer of material has a thickness of less than or equal to about 2 mm.

9. The sound attenuating composite article of claim 6, wherein the first and second layers have a combined thickness of between about four millimeters and thirty millimeters (4–30 mm).

10. The sound attenuating composite article of claim 6, wherein the first, second and third layers have a combined thickness of between about 4 and 25 mm.

11. A method of producing a sound attenuating composite article, comprising:
  providing a first layer of material, wherein the first layer of material is selected from the group consisting of acoustic fiber batting and acoustic foam;
  extruding a second layer of thermoplastic material onto a surface of the first layer of material at a temperature of between about 350° F. and about 450° F. such that the second layer of material fuses to the first layer of material;
  compressing the first and second layers of material to a combined thickness of between about four millimeters and thirty millimeters (4–30 mm);
  extruding a third layer of thermoplastic material onto a surface of the second layer of thermoplastic material at a temperature of between about 300° F. and about 450° F. such that the third layer of material fuses to the second layer of material; and
  compressing the first, second, and third layers of material to a combined thickness of between about 4 mm and about 25 mm.

12. The method of claim 11, wherein the second layer of thermoplastic material comprises material selected from the group consisting of polyethylene, ethylene vinyl acetate, and polypropylene, and wherein the third layer of thermoplastic material comprises material selected from the group consisting of ethylene vinyl acetate, polyvinyl chloride, and thermoplastic elastomer-olefinic.

13. The method of claim 11, further comprising:
  attaching a fourth layer of material to a surface of the third layer of material in face-to-face relationship, wherein the third layer of material comprises a blend of fibers; and
  compressing the first, second, third, and fourth layers of material to a combined thickness of between about 4 mm and about 25 mm.

14. The method of claim 13, wherein the fourth layer of material comprises a blend of at least about 70% polyester fibers and at least about 13% polyolefin fibers.

15. The method of claim 13, wherein the fourth layer of material has a thickness of less than or equal to about 2 mm.

16. The method of claim 11, further comprising:
  heating the composite article to a temperature of between about 200° F. and about 420° F.; and
  compressing one or more selective portions of the heated composite article so as to have an acoustic impedance that is greater than an acoustic impedance of portions adjacent the one or more selected portions.

17. The method of claim 16, wherein heating the composite article to a temperature of between about 200° F. and about 420° F. comprises heating the composite article with infrared radiation.

18. The method of claim 16, wherein heating the composite article to a temperature of between about 200° F. and about 420° F. comprises heating the composite article with a combination of infrared radiation and hot air.

19. The method of claim 13, further comprising:
  heating the composite article to a temperature of between about 200° F. and about 420° F.; and
  compressing selective portions of the heated composite article so as to have an acoustic impedance that is greater than an acoustic impedance of adjacent portions.

20. The method of claim 19, wherein heating the composite article to a temperature of between about 200° F. and about 300° F. comprises heating the composite article with infrared radiation.

21. The method of claim 19, wherein heating the composite article to a temperature of between about 200° F. and about 420° F. comprises heating the composite article with a combination of infrared radiation and hot air.

22. A method of producing a sound attenuating composite article, comprising:
  providing a first layer of material, wherein the first layer of material is selected from the group consisting of acoustic fiber batting and acoustic foam;
  extruding a second layer of thermoplastic material onto a surface of the first layer of material at a temperature of between about 350° F. and about 450° F. such that the second layer of material fuses to the first layer of material; and
  compressing the first and second layers of material to a combined thickness of between about four millimeters and thirty millimeters (4–30 mm).

23. The method of claim 22, wherein the second layer of thermoplastic material comprises material selected from the group consisting of polyethylene, ethylene vinyl acetate, and polypropylene.

24. The method of claim 22, further comprising:
attaching a third layer of material to a surface of the first layer of material in face-to-face relationship therewith, wherein the third layer of material comprises a blend of fibers; and
compressing the first, second, and third layers of material to a combined thickness of between about 4 mm and about 25 mm.

25. The method of claim 24, wherein the third layer of material comprises a blend of at least about 70% polyester fibers and at least about 13% polyolefin fibers.

26. The method of claim 24, wherein the third layer of material has a thickness of less than or equal to about 2 mm.

27. The method of claim 22, further comprising:
heating the composite article to a temperature of between about 200° F. and about 420° F.; and
compressing one or more selective portions of the heated composite article so as to have an acoustic impedance that is greater than an acoustic impedance of portions adjacent the one or more selective portions.

28. The method of claim 27, wherein heating the composite article to a temperature of between about 200° F. and about 420° F. comprises heating the composite article with infrared radiation.

29. The method of claim 27, wherein heating the composite article to a temperature of between about 200° F. and about 420° F. comprises heating the composite article with a combination of infrared radiation and hot air.

30. The method of claim 24, further comprising:
heating the composite article to a temperature of between about 200° F. and about 420° F.; and
compressing selective portions of the heated composite article so as to have an acoustic impedance that is greater than an acoustic impedance of adjacent portions.

31. The method of claim 30, wherein heating the composite article to a temperature of between about 200° F. and about 420° F. comprises heating the composite article with infrared radiation.

32. The method of claim 30, wherein heating the composite article to a temperature of between about 200° F. and about 420° F. comprises heating the composite article with a combination of infrared radiation and hot air.

33. A sound attenuating composite article, comprising:
a first layer of material, wherein the first layer of material is selected from the group consisting of acoustic fiber batting and acoustic foam;
a second layer of thermoplastic material fused to a surface of the first layer of material;
a third layer of thermoplastic material fused to a surface of the second layer of thermoplastic material; and
a fourth layer of material attached to a surface of the third layer of material in face-to-face relationship therewith, wherein the fourth layer of material comprises a blend of fibers and has a thickness of less than or equal to about 2 mm;
wherein one or more selected portions of the composite article are compressed relative to adjacent portions so as to have an acoustic impedance that is greater than an acoustic impedance of portions adjacent the one or more selected portions.

34. The sound attenuating composite article of claim 33, wherein the second layer of thermoplastic material comprises material selected from the group consisting of polyethylene, ethylene vinyl acetate, and polypropylene, and wherein the third layer of thermoplastic material comprises material selected from the group consisting of ethylene vinyl acetate, polyvinyl chloride, and thermoplastic elastomer-olefinic.

35. The sound attenuating composite article of claim 33, further comprising a fourth layer of material attached to a surface of the third layer of material in face-to-face relationship therewith, wherein the fourth layer of material comprises a blend of fibers.

36. The sound attenuating composite article of claim 35, wherein the fourth layer of material comprises a blend of at least about 70% polyester fibers and at least about 13% polyolefin fibers.

37. The sound attenuating composite article of claim 33, wherein the first and second layers of material have a combined thickness of between about four millimeters and thirty millimeters (4–30 mm).

38. The sound attenuating composite article of claim 33, wherein the first, second and third layers of material have a combined thickness of between about 4 and 25 mm.

* * * * *